Nov. 14, 1944. J. MORKOSKI 2,362,712
CUSHION SPRING HITCH FOR PLOWS
Filed Jan. 29, 1943
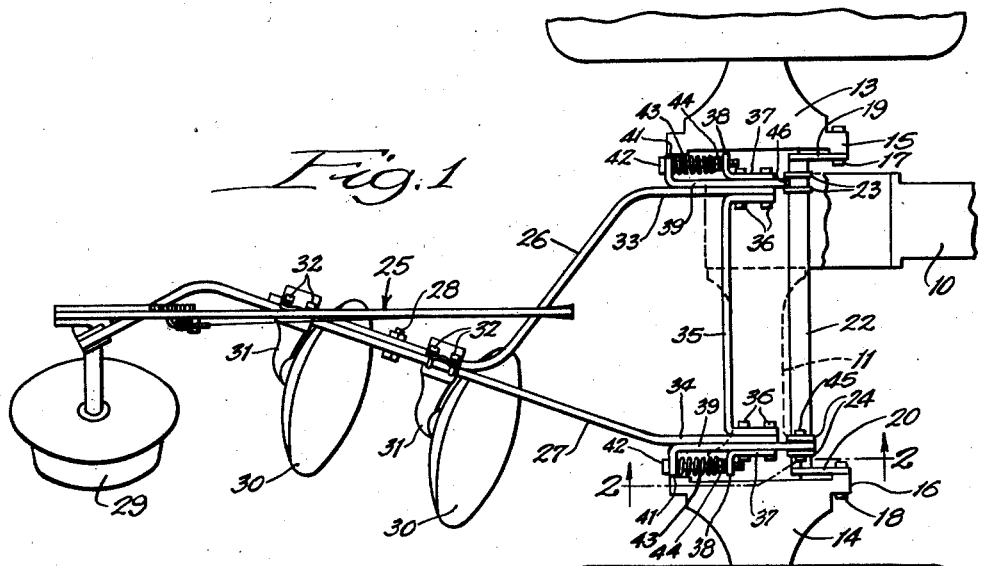
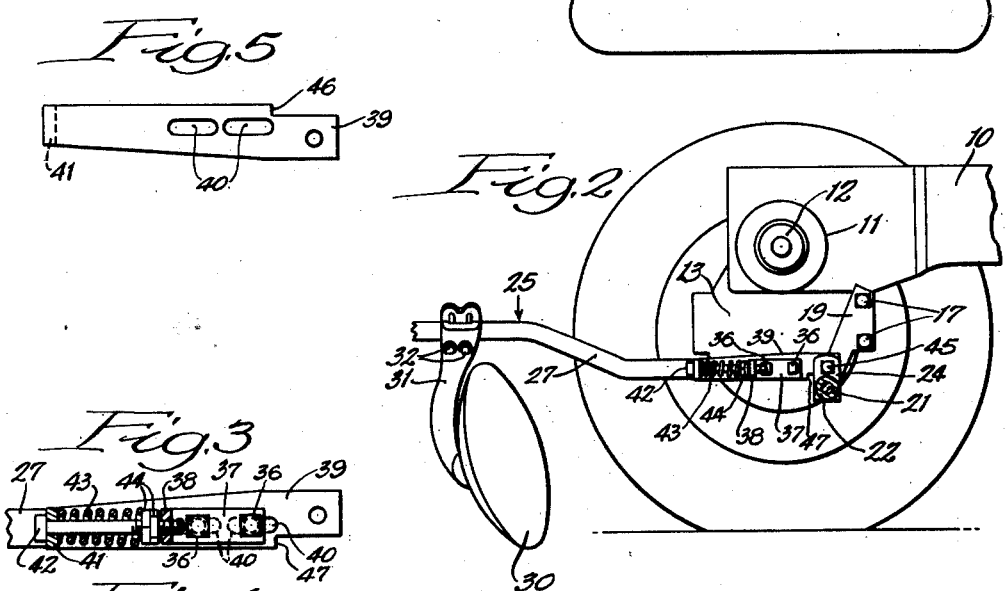
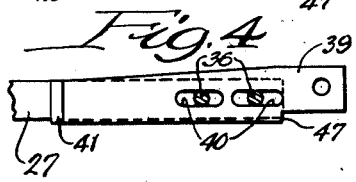
Inventor:
James Morkoski,
By Paul O. Pippel
Attorney.

Patented Nov. 14, 1944

2,362,712

UNITED STATES PATENT OFFICE 2,362,712

CUSHION SPRING HITCH FOR PLOWS

James Morkoski, Canton, Ill., assignor to International Harvester Company, a corporation of New Jersey Application January 29, 1943, Serial No. 473,924

4 Claims. (Cl. 280—33.9)

This invention relates to agricultural implements and, more particularly, to an apparatus for hitching an implement to a support, such as the rear axle housing of a tractor or other structure mounted thereupon.

The invention is applicable to the connection of various soil-working implements to a tractor or other support but is particularly important and will be described herein as applied to the attachment of a disk plow to a tractor. It is well known that the disk-type of plow opposes a broad convex face to the soil being worked and is more apt to be damaged by obstructions than wedge-shaped plows which present a sharp edge to the soil. It is, therefore, important that the connection of the implement to the tractor be such that, upon striking an obstruction, the longitudinal stress to the implement will be cushioned and the danger of injury to the plow and possible breakage of its supporting bracket be minimized.

Therefore, it is an important object of the present invention to provide means for cushioning shocks and avoiding possible damage to a plow or other implement when obstructions are encountered during the course of soil-working operations.

A further object of the invention is the provision of resilient means for connecting the implement to the tractor and means for limiting the longitudinal movement of the implement with respect to the tractor.

With these and other objects in view, the invention contemplates the provision of a bifurcated implement frame, to the spaced arms of which are attached slotted members mounted upon bolts which are affixed to the frame and adapted to ride in the slots in said members. The slotted members are connected at one end to respective arms of the frame by means of springs and at the other end to an equalizer attached to spaced supports mounted on the transverse rear axle of the tractor and adapted for limited rotational movement about a transverse axis.

Other objects and advantages of the invention will become apparent in the following detailed description when read in conjunction with the accompanying drawing, wherein:

Figure 1 is a plan view of the rear end of a tractor having connected thereto a disk plow incorporating the preferred embodiment of the present invention;

Figure 2 is a side elevation, partially in section, of a view taken on line 2—2 of Figure 1, showing the rear end of a tractor with one wheel removed and a portion of a disk plow connected thereto;

Figure 3 is a detail in side elevation, partially in section, showing the manner in which the spring is connected to the right-hand slotted member;

Figure 4 is a detail in side elevation, showing the connection of the right-hand slotted member to the frame; and Figure 5 is a side elevation showing the left-hand slotted member.

Referring to the drawing, the numeral 10 designates the forwardly projecting body of a tractor having a rear axle housing 11 enclosing a rear axle 12. Stub axle housings 13 and 14, depending from axle housing 11, are provided with supporting structures 15 and 16, having vertically spaced openings to receive bolts 17 and 18 for the attachment of an implement frame to the tractor.

Referring particularly to Figures 1 and 2, it will be observed that rearwardly extending brackets 19 and 20 are affixed at one end to respective supporting structures 15 and 16 by means of the bolts 17 and 18, and at the other end to opposite extremities of a transverse shaft 21 provided with a surrounding sleeve 22. Rigidly connected to sleeve 22 adjacent opposite ends thereof are pairs of spaced arms attached at one end to the sleeve and projecting radially therefrom, arms 23 being shown as extending vertically downward, and arms 24 vertically upward from the sleeve 22. Arms 23 and 24 serve as connecting links for the attachment of the arms of a plow frame indicated generally at 25 and, in conjunction with sleeve 22, function as an equalizer by rotation about the shaft 21 when stress is applied to one side or the other of the implement. However, the equalizer forms no part of the present invention, and the implement may, if desired, be connected directly to the supporting structure on the tractor for pivotal movement with respect thereto.

The implement frame indicated at 25 includes a pair of longitudinally extending frame members or arms 26 and 27 connected at 28 to form an elongated, laterally inclined tool-carrying structure, and the conformation of each of the members is such that at their juncture they form a tool-supporting structure of substantially square cross-section. The frame member 27 projects rearwardly beyond the member 26 to provide for the attachment thereto of a rear furrow wheel 29 for supporting the implement with respect to the ground, and disk plows 30 of conventional form are affixed to the tool-carrying portion of the frame by means of brackets 31 held in place on the frame by bolts 32.

Frame members 26 and 27 diverge forwardly from their point of connection to form a bifurcated portion terminating in laterally spaced arms 33 and 34 braced at their ends by a transverse member 35 connected to the inner faces of the two arms by means of bolts 36. These bolts pass through the frame arms and through threaded openings in brackets 37, the rear ends of which are bent outwardly at right angles to provide projections 38. Also mounted upon the bolts 36 between the brackets 37 and the respective arms 33 and 34 of the implement frame are elongated members 39 provided with slots 40 for the reception of bolts 36, and adapted for longitudinal movement with respect to the frame and the brackets, such movement being limited by the length of the said slots. The rear ends of the members 39 are bent outwardly at right angles to provide projections 41 parallel to projections 38. Each of the projections 41 is apertured to receive bolts 42, one end of which is screw-threaded to fit through openings in the projections 38 of brackets 37. Between the projections 38 and 41, the bolts 42 are surrounded by springs 43, one end of which abuts against the projections 41, and the other end against locknuts 44, by which the tension in the springs 43 may be adjusted. Thus, any movement of the members 39 with respect to the implement frame is transmitted to the springs 43, which are so arranged and adjusted as to bias the members 39 in the direction of draft.

The forwardly projecting ends of the members 39 are connected to the supporting structure on the tractor through the intermediary of the arms 23 and 24. As will be observed in Figure 1, these arms are arranged in pairs, one end being affixed to sleeve 22, and the radially projecting ends of each pair have bolts 45 passed therethrough for the pivotal mounting therebetween of the respective members 39, the ends of which are orificed to receive the bolts. The space between the pairs of arms 23 and 24 is sufficient to permit a certain amount of lateral play of the implement frame with respect to the equalizer device.

It will now be clear that with the mechanism just described an implement having one or more points of connection to a tractor or other vehicle may be effectively and simply cushioned against longitudinal stress, such as may be encountered when the plow or other tool strikes an obstruction in the course of soil-working operations. Likewise, by virtue of the equalizing mechanism hereinbefore described and more fully disclosed in co-pending United States application, Serial No. 366,906, now Patent No. 2,324,870, dated July 20, 1943, a force acting upon either side of an implement having two points of connection to a support will cause the implement to swing in the opposite direction. Movement of the implement frame to right or left is limited by the provision at the forward end of the members 39 of recessed portions terminating in abutments 46 and 47 in the upper and lower edges of the left and right hand members, respectively. When the implement frame swings to the left, abutment 46 will contact the sleeve 22, and, when the frame is swung to the right, abutment 47 will contact the sleeve. Thus, the members 39 function not only as a connecting link between the implement and its support, but they likewise function as resilient means to absorb longitudinal shocks to the implement, and as stop means engaging the equalizer to limit the lateral movement of the frame.

Having now described the invention in its preferred embodiment, it should be understood that variations may be made therein without departing from the spirit of the invention. Therefore, the invention should be limited only by the scope of the appended claims.

What is claimed is:

1. In combination, an implement support having spaced attaching portions, an implement, an implement frame adapted for the attachment thereto of soil-working implements, one end of said frame having longitudinally projecting arms for attachment to said spaced portions, a slotted member mounted upon each said arm for longitudinal movement with respect thereto, means for limiting the longitudinal movement of said slotted member, and longitudinally urged resilient means connecting said slotted member to said arm responsive to longitudinal stress imparted to said implement frame.

2. In combination, an implement support, an implement, an implement frame, an angle member bolted to said frame adjacent one end thereof, said member having a portion projecting laterally therefrom, a slotted member extending beyond the end of said frame mounted for sliding movement upon said bolts between said frame and said angle member and having a laterally projecting portion substantially parallel to the laterally projecting portion of said angle member, resilient means connecting the laterally projecting portions of said angle member and said slotted member, and means for connecting said slotted member to said implement support.

3. In combination, a tractor having a transverse rear axle, spaced transversely alined implement attaching portions on opposite sides of said axle, an implement, an implement frame having spaced longitudinally projecting arms for attachment to the spaced attaching portions on the tractor, an angle member bolted to each arm of said frame adjacent one end thereof, said member having a portion projecting laterally therefrom, a slotted member extending beyond the end of said arm mounted for longitudinal sliding movement upon said bolts between said frame and said angle member and having a laterally projecting portion substantially parallel to the laterally projecting portion of said angle member, longitudinally urged spring means connecting the laterally projecting portions of said angle member and said slotted member, and means for connecting said slotted member to said tractor.

4. In combination, an implement support, an implement, a longitudinally extending implement frame, bolts in said frame, a transversely extending element on said frame, a slotted member extending beyond the end of said frame mounted for sliding movement upon said bolts and having a transverse portion substantially in alinement with said element, resilient means connecting said transverse portion and said element, and means for connecting said slotted member to said support.

JAMES MORKOSKI.